United States Patent Office 2,714,102
Patented July 26, 1955

2,714,102

O-HYDROXY-O'-CARBOXY AZO DYESTUFFS

Guido Schetty, Basel, Switzerland, assignor to J. R. Geigy A. G., Basel, Switzerland, a Swiss firm No Drawing. Application January 9, 1952, Serial No. 265,733

Claims priority, application Switzerland January 23, 1951

6 Claims. (Cl. 260—147)

The present invention concerns the production of new o-hydroxy-o'-carboxy azo dyestuffs which, particularly in the form of their complex chrome compounds, are characterised by valuable properties. Also, some of these dyesuffs are excellently suited for the fast dyeing of wool according to the single bath chroming method. The process is for the production of o-carboxybenzene-azo-pyrazolone dyestuffs which, apart from the carboxyl group mentioned contain no further acid groups which form salts with non-caustic alkalies, that is, in particular no sulphonic acid groups and no further carboxyl groups.

It has been found that valuable new monoazo dyestuffs are obtained by coupling a diazotised 2-aminobenzoic acid-4- or -5-sulphonic acid amide or -sulphonic acid ethanolamide with a 1-phenyl-3-methyl-5-pyrazolone. In this coupling the coupling component in the phenyl radical may contain the other substituents usual in azo dyestuffs, most advantageously halogen atoms, but may not contain acid salt forming groups, particularly sulphonic acid, sulphonic acid amide and carboxyl groups.

Diazo components usable according to the present invention are: 2-amino-1-benzoic acid-4-sulphonic acid amide obtainable by reduction from 2-nitro-1-benzoic acid-4-sulphonic acid amide (Ind. Chem. Soc. 10, 47–51 (1933)); 2-amino-1-benzoic acid-5-sulphamide which can be produced by heating to 150–160° C. 2-chloro-1-benzoic acid-5-sulphonic acid amide (French patent specification 850,122) with aqueous ammonia, preferably 25%, in the presence of catalytic amounts of copper, 2-amino-1-benzoic acid-5-sulphonic acid ethanolamide obtained by condensing 2-chloro-1-benzoic acid-5-sulphochloride at room temperature with aqueous ethanolamine to 2-chloro-1-benzoic acid -5-sulphonic acid ethanolamide and exchanging the chlorine atom of this compound for the amino group by heating to a higher temperature with concentrated aqueous ammonia in a closed vessel.

Particularly suitably 1-phenyl-3-methyl-5-pyrazolones usable as coupling components according to the present invention which, with the exception of salt forming acid groups, may contain any substituents desired in the phenyl radical which are usual in azo dyestuffs, are: in particular 1-(chlorophenyl)-3-methyl-5-pyrazolones and among these specially 1-(3'-chlorophenyl)-, 1-(2.5'-dichlorophenyl)- and 1-(3'.4'-dichlorophenyl)-3-methyl-5-pyrazolone.

The dyestuffs according to this invention are particularly valuable in the form of their complex chrome compounds which are obtained by treatment with either ordinary or complex salts of trivalent chrome or with chromium hydroxides. There may be enumerated for example: chromium acetate, chromium formiate or freshly precipitated chromium hydroxide. However, the complex salts of trivalent chrome are particularly suitable for chroming the dyestuffs according to this invention, e. g. the alkali salts of chromosalicylic acid (salicylato-chromiates), the alkali salts of chromoxalic acid (oxalato-chromiates) or the alkali salts of chromotartaric acid (tartrato-chromiates). Also, alkali chromites, alkali glycerin chromites and the salts of hexavalent chromium such as potassium or sodium chromate or bichromate come into consideration as chroming agents. The chroming can be performed either open or under pressure, at increased temperature, in water or suitable organic solvents such as lower alcohols, lower aliphatic ketones, pyridine bases, anilines, in melts of alkali salts of lower fatty acids such as sodium or ammonium acetate, in lower fatty acid amides such as formamide or acetamide, but should be performed in such a way that at least one chrome atom corresponds to two dyestuff molecules. A preferred chroming agent is the ammonium salt of chromosalicylic acid (ammonium chromo-salicylate) and the most advantageous amount of chrome is about 0.6 of a chrome atom to one dyestuff molecule.

As alkali salts, the new chrome containing monoazo dyestuffs so obtained are soluble in water. Should their water solubility not be sufficient for the requirements usual in textile dyeing, it is advantageous to mix the chrome containing dyestuffs according to this invention with alkali carbonates or phosphates or with wetting and/or dispersing agents. They dye wool in golden yellow shades from a weakly acid or neutral bath and the dyeings have very good fastness to washing, milling and light. The dyeings are characterized particularly by the fact that in spite of the very mild dyeing conditions both the points and the roots of the individual hairs are very evenly dyed. The new dyestuffs are superior to the known o-carboxyphenyl-azo-pyrazolone dyestuffs which have sulphonic acid groups, particularly in their drawing power from a neutral to weakly acid bath. This fact enables them to be used for the dyeing of mixtures of wool and cellulose fibres without injuring the cellulose component. They are also excellently suitable, therefore, for the dyeing of silk, synthetic polyamide and polyurethane fibres and also of leather.

The dyestuffs according to this invention which are free from metal, dye wool from a weakly acid bath in yellow shades which, on after chroming, change to reddish-dull yellow shades. By suitable substitution, particularly by suitable introduction of chlorine into the phenyl radical of the pyrazolone coupling component, the dyestuffs according to this invention can be used either according to the single bath chroming process or the chromal method. Due to their excellent affinity to wool from a bath containing ammonium sulphate, even without the addition of any acid whatsoever, they can be dyed within the usual dyeing time from a completely exhausted bath. The shade is also fully developed.

Dyestuffs according to this invention which are very suitable for the single bath chroming method are obtained particularly if 1-(3'.4'-dichlorophenyl)-3-methyl-5-pyrazolone is used as coupling component whereby 2-aminobenzoic acid sulphonic acid amides are to be preferred as diazo components to the corresponding sulphonic acid ethanolamides. The levelling power of this group of metachrome dyestuffs according to the present invention is superior to that of the known monazo dyestuffs made up from diazotised 2-amino-1-benzoic acid-5-sulphonic acid anilide-2'-carboxylic acid and pyrazolones which have no sulphonic acid groups. In addition, the dyestuffs according to this invention can be produced from starting materials which are technically more easily available.

The following examples illustrate the invention without limiting it in any way. Where not otherwise stated, parts are given as parts by weight and the temperatures are in degrees centigrade. The relationship of parts by weight to parts by volume is that of kilogrammes to litres.

Example 1

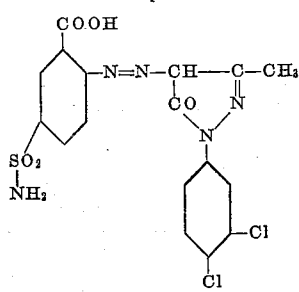

21.6 parts of 2-amino-1-benzoic acid-5-sulphonic acid amide are dissolved at 60° with a weakly alkaline to litmus reaction in 300 parts of water with 6.5 parts of dehydrated soda. 50 parts by volume of 2n solution of sodium nitrite are added and the whole is cooled to 20°. This solution is added dropwise while stirring at 5–8° to a mixture of 30 parts of conc. hydrochloric acid and 100 parts of water, the reaction is made neutral to Congo red by the addition of about 6.5 parts of sodium bicarbonate and then a further 3 parts of sodium bicarbonate are added. A solution of 25.5 parts of 1-(3'.4'-dichloro phenyl)-3-methyl-5-pyrazolone in 200 parts of water and 14 parts by volume of 10-n caustic soda lye is added. The coupling is complete after a short time. The gelatinous mass is heated to 70° and the dyestuff is precipitated by the addition of 140 parts of common salt, filtered off hot and dried. The dyestuff is a clay yellow coloured powder which in hot water forms a cloudy solution and dyes wool in reddish-yellow shades according to the single bath chroming process. The dyeings have excellent fastness to light and good fastness to milling.

If in the above example the 2-amino-1-benzoic acid-5-sulphonic acid amide is replaced by the same amount of 2-amino-1-benzoic acid-4-sulphonic acid amide, a dyestuff is obtained which dyes wool a more greenish-yellow shade. If, however, the 1-(3'.4'-dichlorophenyl)-3-methyl-5-pyrazolone is replaced by 1-(2'.5'-dichlorophenyl)-3-methyl-5-pyrazolone, a dyestuff with similar properties is obtained.

Example 2

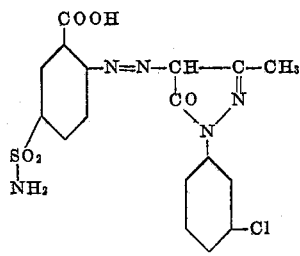

21.6 parts of 2-amino-1-benzoic acid-5-sulphonic acid amide are diazotised as described in Example 1 and coupled as in Example 1 with 21.9 parts of 1-(3'-chlorophenyl)-3-methyl-5-pyrazolone. The dyestuff is precipitated at a raised temperature by the addition of common salt and dried. It is a clay yellow coloured powder which dyes wool in reddish-yellow shades according to the single bath chroming method. The dyeings have good fastness properties.

Example 3

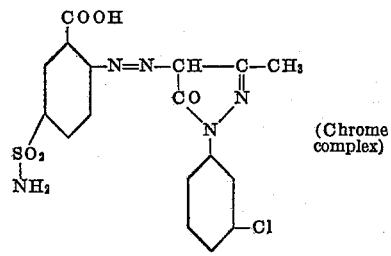

(Chrome complex)

21.6 parts of 2-amino-1-benzoic acid-5-sulphonic acid amide are coupled with 21.9 parts of 1-(3'-chlorophenyl)-3-methyl-5-pyrazolone as described in Example 2. The mixture is diluted with 400 parts of water without isolating the dyestuff, 120 parts of a a solution of ammonium chromo-salicylate (corresponding to 3.12 parts of Cr) is added and the whole is heated for 2 hours at 80° and boiled for a further 2 hours. A brown-yellow solution is formed from which the chrome containing dyestuff is precipitated with common salt. It is filtered off and dried. The dyestuff is in the form of a yellow-brown powder which dyes wool in reddish-yellow shades from a neutral or weakly acetic acid bath. The dyeings have very good fastness to light, good fastness to washing, milling and sea water.

If the dyestuff obtained according to Example 1 is chromed in this manner, a dyestuff with very similar properties is obtained but which draws somewhat more quickly on to wool from a neutral bath.

If, in the above example, instead of 21.9 parts of 1-(3'-chlorophenyl)-3-methyl-5-pyrazolone, 18.3 parts of 1-phenyl-3-methyl-5-pyrazolone, 19.3 parts of 1-(3'-methylphenyl)-3-methyl-5-pyrazolone, 21.5 parts of 1-(4'-methoxyphenyl)-3-methyl-5-pyrazolone, 22.9 parts of 1-(4'-ethoxyphenyl)-3-methyl-5-pyrazolone or 23 parts of 1-(4'-nitrophenyl)-3-methyl-5-pyrazolone are used, dyestuffs are obtained which dye wool in a very similar shade. They have a somewhat less drawing power from a neutral bath but on the other hand the levelling power is slightly increased.

Example 4

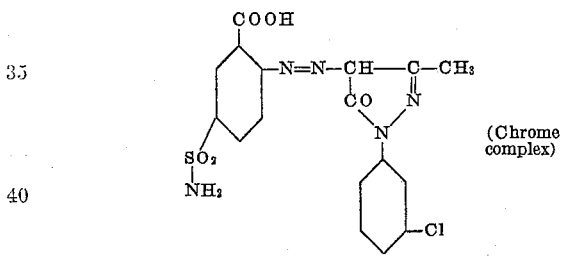

(Chrome complex)

45.8 parts of the monosodium salt of the dyestuff obtained according to Example 2 are stirred into 600 parts of water. Freshly precipitated still damp chromium hydroxide (corresponding to 20 parts of chrome) is added and the whole is boiled for 40 hours. After adding 10 parts by volume of 10-n caustic soda lye, the excess chromium hydroxide is filtered off hot, and the residue is thoroughly washed with hot water. The solution is neutralised with hydrochloric acid and the chrome containing dyestuff is precipitated by the addition of common salt. A yellow-brown powder is obtained which dyes wool a somewhat more pure and more greenish yellow shade from an acetic acid bath than the dyestuff according to Example 3. The dyestuff has a somewhat better levelling power than that obtained according to Example 3 but the dyeings are not quite so fast to sea water.

Example 5

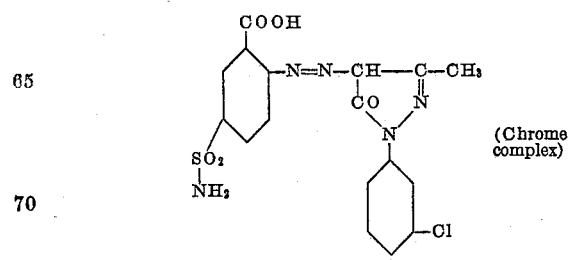

(Chrome complex)

45.8 parts of the monosodium salt of the dyestuff obtained according to Example 2 are boiled in 600 parts of water with 100 parts of a chromium formiate solution (corresponding to 10.4 parts Cr) for 18 hours. 60 parts by volume of 10-n caustic soda lye are then added and the chrome complex is salted out while still warm. It is filtered off and dried. A yellow-brown powder is obtained which dyes wool a somewhat more pure and more greenish yellow shade from an acetic acid bath than the dyestuff according to Example 2.

*Example 6*

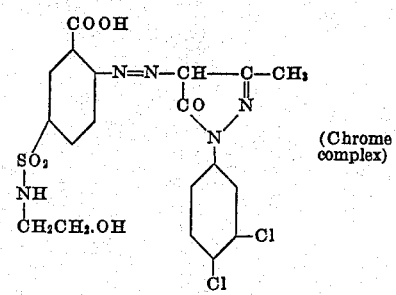

(Chrome complex)

26.0 parts of 2-amino-1-benzoic acid -5-sulphonic acid ethanolamide are dissolved in 200 parts of hot water with 10 parts by volume of 10-n caustic soda lye. 25 parts by volume of 4-n sodium nitrite solution are added and, after cooling, the whole is added dropwise to a solution of 30 parts of conc. hydrochloric acid and 100 parts of water. A temperature of from 5–8° is maintained by cooling. The reaction is made neutral by the addition of sodium bicarbonate, a further 3 parts of sodium bicarbonate are added. The whole is then poured into a solution of 25.5 parts of 1 - (3'.4' - dichlorophenyl) - 3-methyl-5-pyrazolone in 200 parts of water and 14 parts by volume of 10-n caustic soda lye which has been cooled to 5° and stirred for 2 hours at 0–5°. The gelatinous mass is heated to 70° and the dyestuff is precipitated by the addition of 45 parts of conc. hydrochloric acid. The dyestuff is filtered off, washed with water and in 800 parts of water containing 12 parts of dehydrated soda, boiled for 4 hours under reflux while stirring with 200 parts of a solution of ammonium chromo-salicylate (corresponding to 5.2 parts Cr). The dyestuff is then salted out, filtered off and dried. It is a brown yellow powder which dissolves well in hot water and dyes wool in reddish-yellow shades from a neutral or weak acetic acid bath. The dyeings have very good fastness to washing, milling, alkali and light.

*Example 7*

2 parts of the dyestuff obtained according to Example 1 are dissolved in 3,000 parts of water. 1.6 parts of sodium chromate, 2.4 parts of ammonium sulphate and 10 parts of Glauber's salt are added. 100 parts of wool are entered at 30°, the bath is brought to the boil within 30 minutes and kept boiling for 2 hours while moving the wool well. Thereafter the wool is rinsed and dried. When dyed according to this process, the wool is dyed a full golden yellow shade and the dyeing has very good fastness to light, milling and alkali.

*Example 8*

2 parts of the dyestuff obtained according to Example 3 are dissolved in 4,000 parts of water. 10 parts of Glauber's salt are added and 100 parts of wool are entered at 50°. The bath is brought to the boil within 15 minutes and kept at the boil for 1½ hours while moving the wool well. The wool is then rinsed and dried. The wool is very evenly dyed in a reddish-yellow shade and the dyeing has very good fastness to light, washing and sea water.

What I claim is:

1. A member selected from the group consisting of the o-hydroxy-o'-carboxy azo dyestuffs corresponding to the formula:

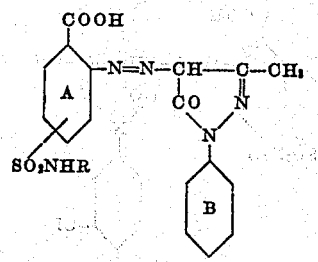

and the complex chromium compounds thereof, wherein the substituent SO2NHR with R as a member selected from the group consisting of H and hydroxyethyl is in one of the positions 4 and 5 of nucleus A and wherein the benzene nucleus B contains a substituent selected from the group consisting of H, CH3, NO2, OCH3, OC2H5 and Cl.

2. The complex chromium compound of the o-hydroxy-o'-carboxy azo dyestuff having the formula:

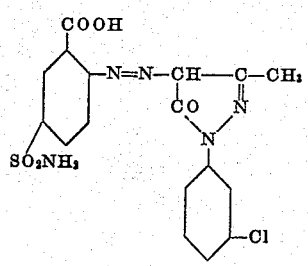

3. The complex chromium compound of the o-hydroxy-o'-carboxy azo dyestuff having the formula:

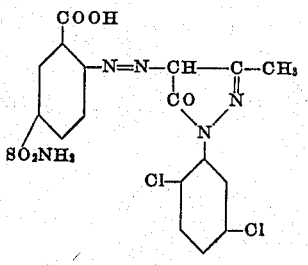

4. The complex chromium compound of the o-hydroxy-o'-carboxy azo dyestuff having the formula:

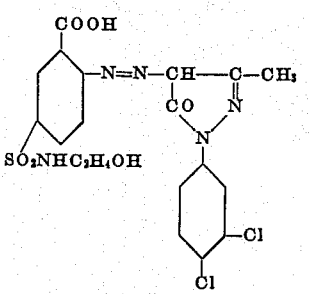

5. The complex chromium compound of the o-hydroxy-o'-carboxy azo dyestuff having the formula:

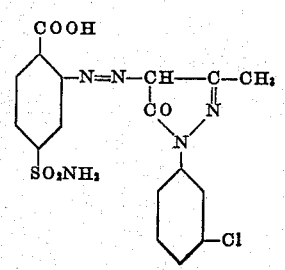

6. The complex chromium compound of and the o-hydroxy-o'-carboxy azo dyestuff having the formula:
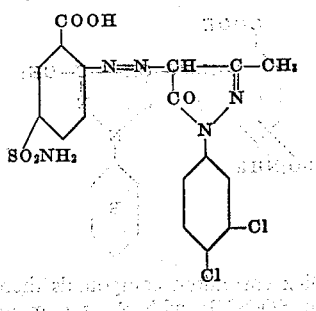
References Cited in the file of this patent
UNITED STATES PATENTS
| | | |
|---|---|---|
| 1,623,005 | Gubler et al. | Mar. 29, 1927 |
| 2,434,173 | Mackenzie et al. | Jan. 6, 1948 |
| 2,551,056 | Schetty | May 1, 1951 |
| 2,565,898 | Widmer et al. | Aug. 28, 1951 |
| 2,606,185 | Widmer et al. | Aug. 5, 1952 |